United States Patent [19]
Roscoe

[11] 4,249,206
[45] Feb. 3, 1981

[54] AUDIO AND VISUAL INTERCOMMUNICATION AND SURVEILLANCE SYSTEM

[76] Inventor: Thomas T. Roscoe, 1516 E. Las Olas Blvd., Ft. Lauderdale, Fla. 33301

[21] Appl. No.: 787,374

[22] Filed: Apr. 14, 1977

[51] Int. Cl.³ .................... H04N 7/16; H04N 7/18
[52] U.S. Cl. ................................................ 358/86
[58] Field of Search ............... 358/93, 86, 108, 139, 358/181, 85; 325/308; 179/2 TV

[56] References Cited
U.S. PATENT DOCUMENTS

| | | | |
|---|---|---|---|
| 3,484,548 | 12/1969 | Kowal et al. | 358/181 |
| 3,517,120 | 6/1970 | Bunting | 358/93 |
| 3,534,161 | 10/1970 | Friesen et al. | 358/93 |
| 3,588,336 | 6/1971 | Scher | 358/85 |
| 3,946,159 | 3/1976 | Fay | 179/2 TV |

Primary Examiner—Robert L. Griffin
Assistant Examiner—Joseph A. Orsino, Jr.
Attorney, Agent, or Firm—Clarence A. O'Brien; Harvey B. Jacobson

[57] ABSTRACT

A communication network interconnecting a master control station with a plurality of remote substations, each station having a television receiver connected to a master antenna distribution system. The receiver components are selectively converted into an arrangement with closed circuit television cameras at each station for televised intercommunication under control of the operator at the control station, the cameras also being utilized in a substation surveillance mode of operation. A video tape recorder having a playback capability is operationally coordinated into the network for replay of recorded programs at any station.

10 Claims, 6 Drawing Figures

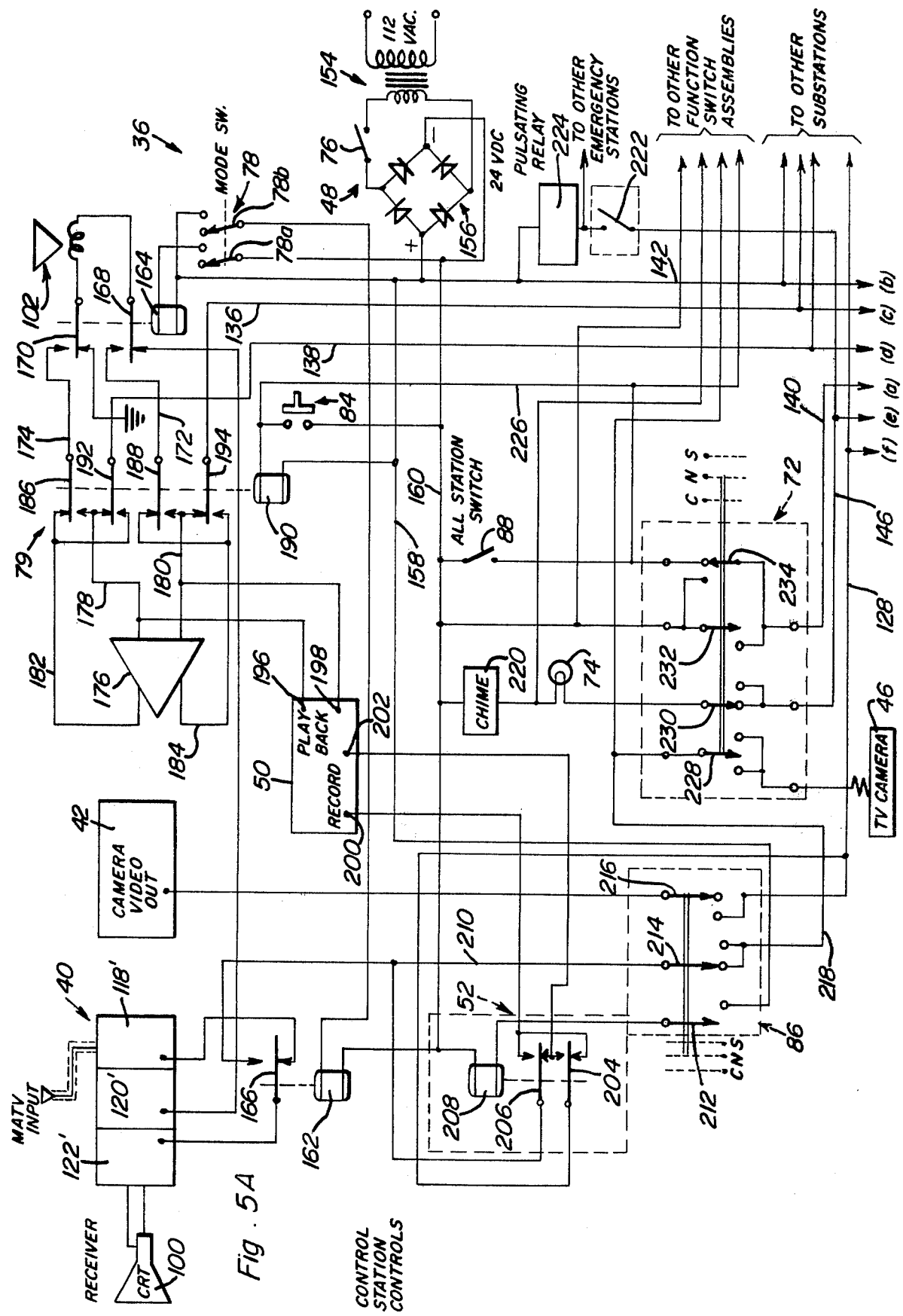

AUDIO AND VISUAL INTERCOMMUNICATION AND SURVEILLANCE SYSTEM

BACKGROUND OF THE INVENTION

This invention relates to a multifunction type of intercommunication system coordinated with a master distribution antenna for reception of broadcast programs originating from an external source. This application is related to application Ser. No. 801,097, filed Feb. 20, 1969, now abandoned.

There are many installations such as hospitals, schools and industrial complexes, at which a variety of electronic equipment is installed serving different functions. This equipment includes for example television receivers, intercom apparatus, recording and playback apparatus, audio reproduction apparatus, etc. The total or accumulated cost of such equipment is considerable and furthermore creates a space and installational mounting problem.

An important object of the present invention therefore is to provide a coordinate system which eliminates duplication of components common to a variety of different electronic apparatus often installed at installations as aforementioned with a consequential reduction in equipment and maintenance costs. Furthermore, greater utility is realized from the electronic equipment because of the increased convenience resulting from the system into which they are integrated in accordance with the present invention. The system of the present invention will, for example, be particularly useful in hospitals and convalescent centers for nurse call signalling, surveillance, intercommunication and entertainment purposes. In schools and colleges, the system will facilitate teaching and in business and industry, it will be useful for communication and management control purposes.

PRIOR ART STATEMENT

Applicant is presently aware of the following U.S. Pat. Nos. cited in the aforementioned abandoned application:

3,281,695—Base
3,402,259—Takahashi
3,423,521—Friesen
3,426,145—Kimball

None of the foregoing patents is deemed relevant to the claimed invention.

SUMMARY OF THE INVENTION

The present invention is associated with a master antenna signal distribution system connected to standard receivers at a plurality of remotely spaced stations including a master control station and any number of substations. Each station is also provided with a television camera built into a console together with the television receiver. A video tape recorder is also associated with the console at the master control station. The console at the master control station is provided with station selecting controls and station identifying indicators as well as other controls. By interstage switching of the receivers under relay control, the system is operative to establish televised intercommunication between the master control station and any selected substation, televised presentation from the master control station to all of the substations simultaneously and surveillance of any substation from the master control station through selected receiver stages without interruption of master antenna signal reception at the substation. The system of the present invention thus does not interfere with selectivity at any station of standard television broadcasts on all UHF and VHF channels, educational and instructional television broadcast and FM broadcast material. Audio and video signals originating at any of the stations may also be recorded at the master control station and the recorded material replayed at the master control station, a selected substation or at all of the substations.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5A is an electrical circuit diagram illustrating the system network at the master control station.

DESCRIPTION OF THE PREFERRED EMBODIMENT

Figure 1:
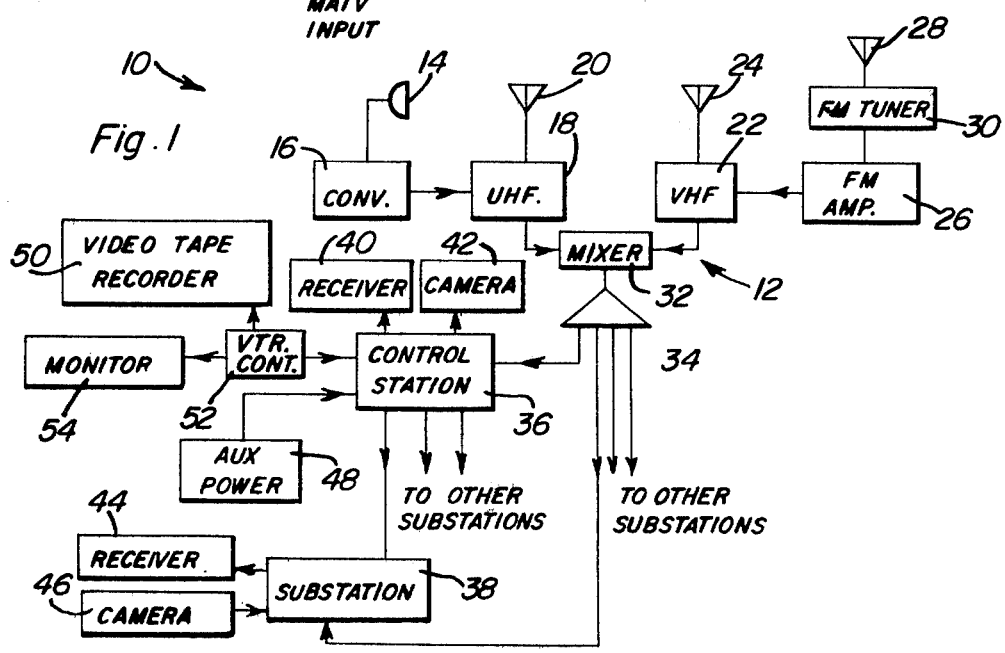
FIG. 1 is a schematic block diagram illustrating the entire system of the present invention.

Referring now to the drawings in detail, and initially to FIG. 1, it will be noted that the system of the present invention generally referred to by reference numeral 10, has associated therewith, a master antenna distribution system generally denoted by reference numeral 12. Microwave signals are introduced through the antenna 14 and converted to UHF frequency signals through a 2500 MHZ down converter 16. The converted UHF signals are fed to a UHF head end component 18 which also accepts an RF signal input from the antenna 20. RF signals in the entire broadcast range are also accepted through the VHF head end component 22 from the antenna 24 through which VHF signal frequencies are also introduced from FM amplifier 26 to which antenna 28 is connected through the FM tuner 30. Thus, microwave and FM radio transmission signals are converted to UHF and VHF frequencies of unused channels through the antennas 14 and 28 while RF signals in the entire broadcast range of VHF and UHF television frequencies are introduced through antennas 20 and 24, all of said signals being conducted to the mixer component 32 from which they are distributed by a multisplitter component 34 to a master control station 36, and a plurality of substations 38.

The control station 36 has associated therewith, a standard television receiver 40 and a television camera 42. The receiver is of a commercially available type having an a.c. power switch, a VHF channel selector, a UHF channel selector, broadcast volume control, as well as the other usual television receiver controls such as the contrast, brightness, horizontal deflection and vertical deflection controls. The television camera is also of a commercially available type having an a.c. power switch, manual lens focus control, target, beam and focus controls, and standard internal adjustment controls. Similar standard television receivers and cameras 44 and 46 are associated with each of the substations 38, as diagrammed in FIG. 1. Also associated with the control station 36, is an auxiliary power supply 48 and video tape recorder 50. The video tape recorder is of the type having continuous recording and playback capability, automatic remote activation, automatic rewind, automatic shut-off, simultaneous recording of picture and sound and instant replay capabilities. The recorder should also be capable of recording live subjects or broadcast television, and be capable of video and audio monitoring while recording. A remote control component 52 is associated with the recorder 50 as well as a receiver monitor 54 through the which VHF and UHF channel broadcasts may be recorded on the recorder 50.

Figure 2:
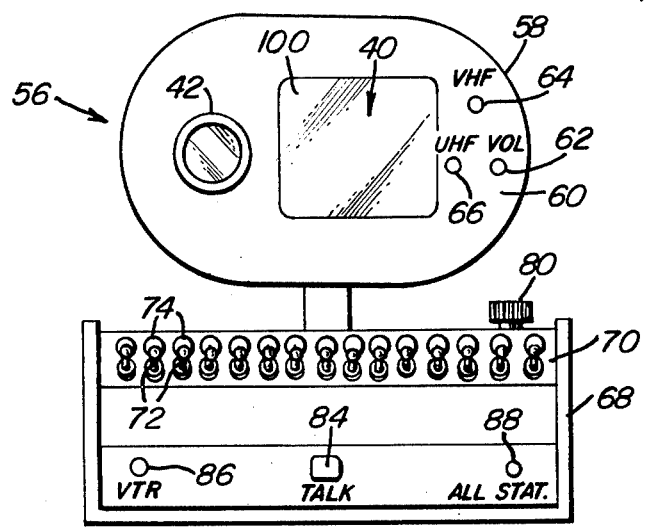
FIG. 2 is a front elevational view of a master control station console unit constructed in accordance with the present invention.
Figure 3:
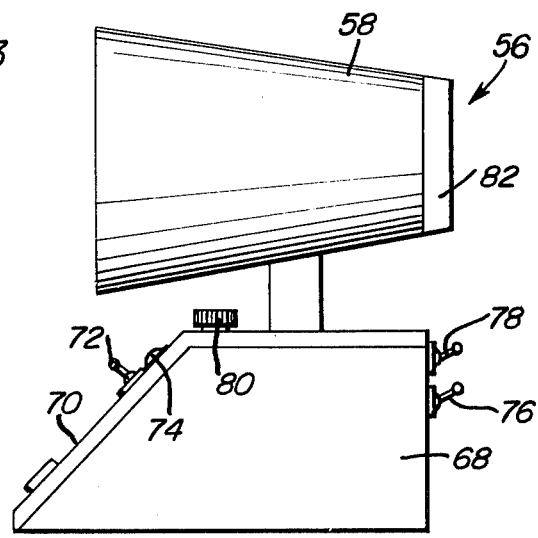
FIG. 3 is a side elevational view of the unit illustrated in FIG. 2.

Referring now to FIGS. 2 and 3, a console unit 56 for the master control station is illustrated mounting on one chassis, the television receiver 40 and the television camera 42 within the upper housing portion 58. The front face panel 60 of the housing portion 58 may also mount the volume control 62, the VHF tuner 64 and the UHF tuner 66. It will be apparent therefore, that broadcast channel selectivity is accommodated at the master control station as well as televised intercommunication.

The upper housing portion 58 is mounted above the base portion 68 of the chassis to which various components are connected including the auxiliary power supply 48, the video tape recorder 50, the recorder control 52 and the monitor-receiver 54 aforementioned in connection with the control station 36 depicted in FIG. 1. In addition thereto, the base portion 68 of the chassis encloses an audio intercom amplifier, call signalling components, switches, and relays to be hereafter described.

The front control panel 70 of the chassis base portion mounts a plurality of multiposition substation selection switch assemblies 72. Mounted above each of the switch assemblies, is a substation identifying indicator lamp 74. Through the switch assemblies 72, communication with a selected substation may be established. A calling substation is identified by illumination of the corresponding indicator lamp 74.

The chassis base portion 68 also mounts on its rear panel a power switch 76 as shown in FIG. 3 disposed adjacent to a mode control switch 78. an intercom volume control 80 is mounted on top of the base portion. The receiver and camera adjustment controls are mounted within the rear section 82 of the upper portion 58. For the purposes of controlling intercommunication at the master control station, a talk control push button switch 84 is mounted on the control panel 70 of the base portion 68 which also mounts a control switch assembly 86 for the video tape recorder. For the purpose of simultaneously communicating with all of the substations, an all station control switch 88 is mounted on the control panel.

Figure 4:
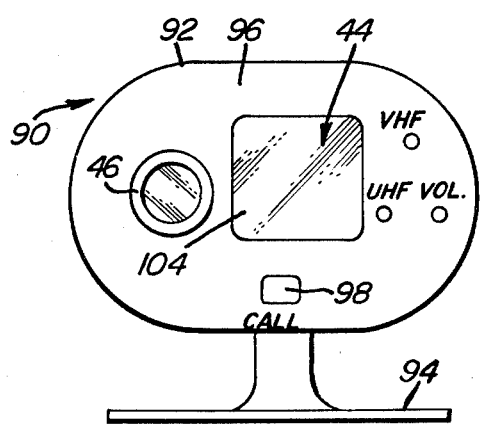
FIG. 4 is a front elevational view of a substation console unit constructed in accordance with the present invention.

A less complex console unit 90 is located at each substation as illustrated in FIG. 4. The unit 90 includes a chassis 92 mounted on a base 94. The chassis 92 is similar to the upper housing portion 58 of master control station console unit 56 and includes a front face 96 through which the television receiver 44 and the television camera 46 are exposed. In addition to the volume control, and the VHF and UHF tuning controls, the front face 96 of the chassis also mounts a call push button switch 98 through which a person at a substation may signal the master control station in order to initiate televised intercommunication which may then be controlled by an operator at the master control station through the talk push button switch 84 and one of the switch assemblies 72 underlying an associated indicator lamp 74 illuminated when the call push button switch 98 at a substation is actuated.

Figure 5B:
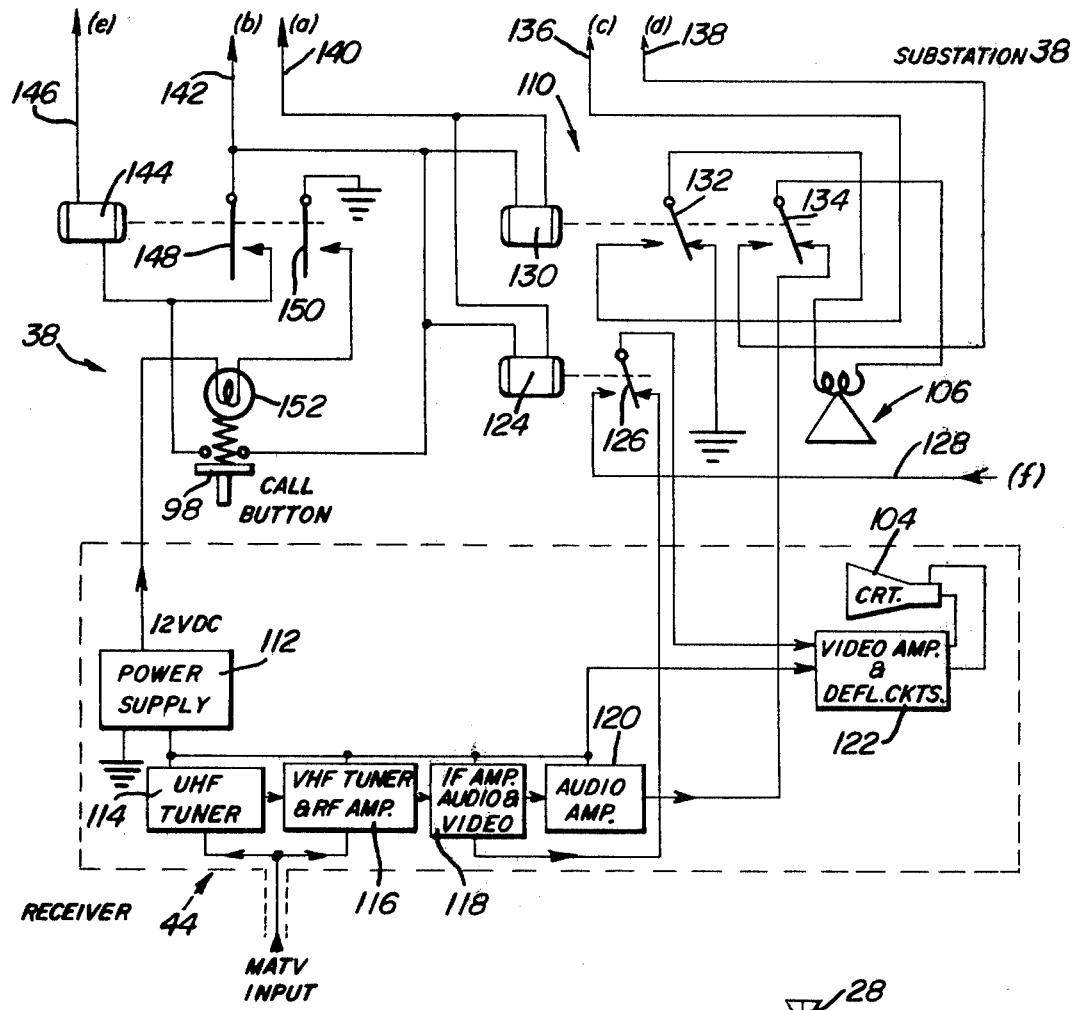
FIG. 5B is an electrical circuit diagram illustrating the system network at one of the substations.

The console unit 56 at the master control station 36 is interconnected with each of the units 90 at the substations 38 which are also interconnected through the receivers 40 and 44 with the master antenna distribution system 12, in order to present standard broadcast program material to persons at the stations 36 and 38 through cathode ray pictue tubes 100 and 104 as shown in FIGS. 5A and 5B. An audio output speaker 102 is also shown in FIG. 5A associated with receiver 40 while an audio speaker 106 is shown in FIG. 5B associated with each receiver 44. In accordance with the present invention, the foregoing components of the receiver 40 may be disconnected by relays at the master control station and at a selected substation through a similar relay under control of a station selector switch assembly 72 through which the receivers are interconnected with the television cameras 42 and 46 for televised intercommunication. The receivers 40 are accordingly conditioned through the relays for intercommunication purposes by an intercom control assembly 79. Since the intercommunication operational mode is under control of the operator through switch 78 at the control station 36 only, a call is initiated through a signalling circuit from the substation 38 to the control station 36 by a signal generated upon actuation of the call push button switch 98, the signal being transmitted to the appropriate station identifying signal lamp 74. Through the station selector 72, the recorder 50 is rendered operative to record program material originating either at the master control station or at any of the substations as well as to present to any or all of the substations, program material recorded from standard broadcasts received at the master control station by the monitor receiver 54 as aforementioned in connection with FIG. 1.

Referring now to FIG. 5B, pertaining to one of the substations 38, it will be noted that the receiver 44 includes its own power supply 112 through which the various stages or components of the receiver are energized including the input stages consisting of the UHF tuner 114 and the VHF tuner and RF amplifier 116, the IF amplifier, audio and video component 118 and the audio amplifier 120. The output of the video circuits from component 118 is connected to an output stage of the receiver such as the video amplifier and deflection circuit component 122 through the relay component 110. The speaker 106 is also connected to the output of the audio amplifier 120 through the relay component 110. The relay component 110 includes a relay coil 124 and an associated interstage relay switch 126 which in its normal position as shown in FIG. 5B connects the component 118 to the output component 122 of the same receiver 44 to which the picture tube 104 is connected. When the relay coil 124 is energized, the interstage switch 126 is displaced to its other operative position disconnecting the components of receiver 44 and connecting the video output component 122 to the television camera 42 at the master control station through conductor 128.

The relay component 110 also includes a relay coil 130 and associated relay switches 132 and 134. In the normal positions of the relay switches as shown in FIG. 5B, the output coil of speaker 106 is connected to ground through relay switch 132 while relay switch 134 connects the input terminal of the speaker coil to receiver component 120. Thus, when the system is in a quiescent state with the relay coils 124 and 130 de-energized, standard broadcast reception is obtained from the antenna distribution system connected to components 114 and 116 of receiver 44 at each of the substations as shown in FIG. 5B. When the relay coil 130 is energized simultaneously with the relay coil 124, the relay switches 132 and 134 are displaced to the other operative positions disconnecting the speaker 106 from ground and receiver component 120 and at the same time connecting the speaker 106 to the intercom controls at the master control station through conductors 136 and 138. Power for energizing the relay coils 124 and 130 is derived from the master control station through conductors 140 and 142 to which both of the relay coils are connected in parallel.

The power at the master control station 36 is also utilized to energize a call relay coil 144 at each of the substations upon momentary closing of the call push button switch 98 at the substation. Thus, as shown in FIG. 5B, the relay coil 144 is connected at one terminal to the power supply at the master control station through conductor 146, the other terminal of the relay coil being connected to one terminal of the switch 98, the other terminal of the switch being connected to conductor 142. When the relay coil 144 is energized upon momentary closing of the switch 98, the normally opened relay switch 148 associated therewith completes a relay holding circuit so that the relay coil 144 will remain energized after the switch 98 is released. A second normally open relay switch 150 is also closed upon energization of the relay coil 144 to connect one terminal of a push button indicator lamp 152 to ground, the other terminal of the indicator lamp being connected to the 12 VDC output of the power supply 112 associated with the receiver 44. Illumination of the lamp 152 will therefore not only indicate that a call signal has been dispatched to the master control station from the substation, but that the receiver at the substation is in an operating condition because of the availability of electrical energy from its power supply 112. It is important to note at this point however, that the relay coils 124, 130 and 144 at the substations are energized from power derived from the master control station and under control of the operator at the control station from which the operational mode is controlled and the substation selection made.

Referring now to FIG. 5A, the circuit arrangement at the master control station 36 is illustrated. The auxiliary power supply 48 aforementioned includes a voltage step-down transformer 154, the secondary circuit of which is connected across the input terminals of a full wave rectifier 156 upon closing of the power switch 76 in order to supply 24 VDC across the positive and negative voltage lines 160 and 158. A source of d.c. voltage is thereby made available for operating the various components at the master control station as well as the relay coils 124, 130 and 144 at each of the substations as aforementioned.

The relay components for controlling the operational mode of the standard receiver 40 at the master control station, include a pair of relay coils 162 and 164 which are functionally similar to the relay coils 124 and 130 hereinbefore described in connection with receiver 44 at the substation. The receiver 40 at the master control station as shown in FIG. 5A is therefore similar in construction and operation to the receiver 44 and hence includes various stages such as a video output component 122' connected to the picutre tube 100, an audio output component 120' adapted to be connected to the speaker 102 and a signal input component 118' adapted to be connected to component 122' by the relay interstage switch 166 in its normal position with the relay coil 162 de-energized as shown in FIG. 5A. Energization of the relay coil 162 will therefore disconnect the components 118' and 122' in order to interrupt signal reception from the antenna distribution system to which the input component 118' is connected. The audio output component 120' on the other hand is connected to the input terminal of speaker 102 by the relay switch 168 in its normal position as illustrated when the relay coil 164 is de-energized, the other terminal of the speaker being grounded through the relay switch 170 in its normal position. Energization of the relay coil 164 displaces the relay switches 168 and 170 to the other operative positions thereof connecting the speaker coil to the intercommunication control assembly 79 through conductors 172 and 174.

The relay coils 162 and 164 are energized by displacement of the mode switch 78 to an intercom position completing parallel energizing circuits through the relay coils. The switch 78 therefore includes a switch section 78a adapted to connect the voltage line 160 to one terminal of the relay coil 164, the other terminal being connected to the voltage line 158. A second switch section 78b, is adapted to connect one terminal of the relay coil 162 to the voltage line 158, the other terminal of the relay coil 162 being connected to the voltage line 160.

Intercommunication between the master control station and the substations, is established upon energization of the relay coils 162 and 164 through the intercommunication control assembly 79 which includes an audio intercom amplifier 176 to which signal input lines 178 and 180 are connected and to which amplified signal output lines 182 and 184 are connected. The signal output lines 182 and 184 are connected to relay contacts normally engage by relay switches 186 and 188 connected to the normally disengaged contacts associated with relay switches 168 and 170. Thus, it will be apparent that upon energization of the relay coil 164, the speaker 102 will not only be disconnected from the audio output component 120' of the receiver 40 but will at the same time be connected to the signal output lines of the intercom amplifier 176 as long as the audio control relay coil 190 associated with the relay switches 186 and 188 remains de-energized, as shown in FIG. 5A. Also, associated with the relay coil 190 are relay switches 192 and 194 normally engaged with contacts connected to the signal input lines 178 and 180 to the intercom amplifier. The relay switches 192 and 194 are connected to the conductors 138 and 136 that extend to the aforementioned relay component 110 at each of the substations so as to connect the speakers 106 at the substations to the input of the intercom amplifier when relay coil 190 is de-energized and the relay coils 124 and 130 at the substations are energized. Thus, energization of the relay coils 124 and 130 at any substation will convert the receiver speaker 106 to a microphone. The speakers 106 at the substations are audio transducers capable of being switched between microphone and speaker operation. It will also be apparent that whenever power is supplied to a relay component 110 at any of the substations, energizing the relay coils 124 and 130, a person at the substation may utilize the audio transducer 106 as a microphone to communicate with a person at the master control station if the mode switch 78 is in its intercom position disconnecting the speaker 102 from the audio output component 120' of the receiver 40 while connecting it to the output of the intercom amplifier 176 by energization of the relay coils 162 and 164. When the person at the master control station wishes to respond to an audio message received from a substation, the talk push button switch 84 is actuated in order to complete an energizing circuit for the relay coil 190 by connecting it across the voltage lines 158 and 160. Energization of the relay coil 190 reverses the connections of the input and output lines of the intercom amplifier 176 so as to convert the speaker 102 at the master control station to a microphone while the transducer 106 at the substation assumes the function of a speaker. Toward this end, energization of the relay coil 190 displaces the relay switches associated therewith to the other operative positions electrically connecting the signal output lines 182 and 184 to the conductors 138 and 136 through relay switches 192 and 194 while the signal input lines 178 and 180 are electrically connected through relay switches 186 and 188 to conductors 174 and 172 connected across the terminals of the audio transducer 102 through the actuated relay switches 170 and 168.

The input signal lines 178 and 180 to the intercom amplifier 176 are also connected to the input-output terminals 196 and 198 associated with the video tape recorder 50. In this fashion, audio signals originating either at the master control station or at any of the substations may be recorded. Also, material recorded on the video tape recorder 50 may be replayed either at the master control station or at any of the substations. It will be further apparent that when the relay coil 190 is deenergized, audio signals may either be recorded from a substation or replayed at the master control station since the terminals 196 and 198 or the recorder will then be connected to the input signal lines of the intercom amplifier 176 and to the transducer 106 at the substation if its relay component 110 is energized. On the other hand, when the relay coil 190 is energized, the recorder 50 will be operative to record audio signals from the transducer 102 at the master control station or replay recorded signals to the transducer 106 at a substation.

The recorder 50 is also operative to record and replay video signals through the record and playback terminals 200 and 202 originating either at the master control station or at any of the substations. The video record terminal 200 is therefore connected through relay contacts of control component 52 to the video tape recorder control switch 86 one of said contacts normally engaged by relay switch 204 connected to conductor 128 extending to each of the substations. The conductor 128 it will be recalled, is connected to the normally disengaged relay contact associated with relay interstage switch 126 at each substation 38. The conductor 128 is adapted to be connected to the television camera 42 at the master control station through the video tape recorder control switch assembly 86 in order to record video signals originating at the master control station. Thus, video signals being transmitted from the master control station to a substation through actuated interstage switch 126 may at the same time be recorded at the master control station. A second relay switch 206 associated with the control switch 86 is normally engaged with a relay contact connected to the video playback terminal 202 of the recorder. The relay switch 206 is connected to the normally disengaged contact associated with interstage switch 166 so that upon energization of the relay coil 162, video signals recorded by the recorder may be replayed at the master control station through the video output component 122' of receiver 40 to which interstage switch 166 is connected. The relay switches 204 and 206 are actuated upon energization of the relay coil 208, one terminal of which is connected to the voltage line 160. Energization of the relay coil 208 is operative to reverse the connections to the record and playback terminals 200 and 202 of the recorder thereby electrically connecting terminal 200 to the switch assembly 86 through conductor 210 while terminal 202 is electrically connected through relay switch 204 to the conductor 128. In this manner, video signals originating from a substation camera may be recorded while recorded video signals from the recorder may be replayed at a substation.

The relay coil 208 of the control component 52 is energized under control of the switch assembly 86 to control the recording the playback functions aforementioned. The switch assembly 86 is therefore displaceable in opposite directions from a neutral position (N) as illustrated in FIG. 5A to two other operative positions. The switch assembly 86 includes switch sections 212, 214 and 216. The switch section 212 is connected to a terminal of relay coil 208. In the neutral position illustrated, the relay coil 208 remains de-energized so that video signals may be recorded from the television camera 42 at the master control station which is then connected by the switch section 216 to the relay switch 204 connected to the terminal 200 of the recorder through the normally engaged relay contact. The playback terminal 202 will then be connected by relay switch 206 to the switch section 214 of the switch assembly 86 which in the neutral position is connected by conductor 218 to the station selecting switch assemblies 72.

When the switch assembly 86 is displaced from its neutral position in a left-hand direction as viewed in FIG. 5A, to a master station position (C), the relay coil 208 remains deenergized while the playback terminal 202 of the recorder is disconnected by switch section 214 from conductor 218. The television camera 42 at the master control station however, remains connected through switch section 216 to the conductor 128. Thus, in the master station position of the switch assembly 86, video signals originating at the master station may be recorded and recorded video signals replayed at the master station.

When the switch assembly 86 is displaced from its neutral position in a right-hand direction as viewed in FIG. 5A to a substation position (S), the switch section 212 connects the terminal of relay coil 208 to the voltage line 158 for energization of the relay coil thereby reversing the connections to the terminals 200 and 202 of the recorder as aforementioned. At the same time, switch section 126 disconnects the television camera 42 at the master control station from conductor 128 while switch section 214 maintains the electrical connection between conductors 210 and 218. In this fashion, video signals originating at any substation may be recorded while recorded video signals may be replayed at any substation.

It will be apparent from the foregoing, that the substation with which intercommunication is established from the master control station as well as the substation at which the recording the replay functions are performed under control of the switch assembly 86, is selected by the station selector switch assemblies 72. It will also be apparent from the foregoing that intercommunication, recording and replay functions may be initiated from the master control station. The signalling facilities, controlled from each of the substations as aforementioned, is however provided in view of the lack of similar controls at each of the substations. The relay coil 144 associated with the call circuit at each of the substations, as shown in FIG. 5B, is connected by conductor 146 and an associated switch assembly 72 as shown in FIG. 5A to the voltage line 160 in series with an associated indicator lamp 74 and a single chime 220 connected in parallel to each of the lamps 74 and arranged to produce an alerting pulse tone each time current is conducted therethrough. An energizing circuit through the relay coil 144 is completed as aforementioned upon closing of the call push button switch 98 to thereby connect the relay coil 144 to the voltage line 158 at the control station through conductor 142. Thus, whenever the relay coil 144 at a substation is energized upon closing of its call button switch 98, it remains energized through its relay holding switch 148 to continuously conduct current through the associated indicator lamp 74 at the master control station. The initial application of voltage to the chime 220 produces a single tone for alerting the operator at the master control station. Thus, a normal call alerting signal may be dispatched from any substation to the master control station upon actuation of the call push button switch 98. An emergency call signal on the other hand may be generated adjacent each substation by closing of an emergency switch 222, as shown in FIG. 5A, to thereby complete an energizing circuit through an associated switch assembly 72 in series with the indicator lamp 74 and the chime 220. The emergency switch 222 is therefore connected to the conductor 146 and when closed connects the conductor 146 to the voltage line 158 through a pulsating relay component 224 to thereby intermittently interrupt the series circuit through the chime 220. Such interruption in the voltage across the chime 220, produces an intermittent or repeating pulse tone output from the chime indicative of an emergency situation.

In order to establish communication from the master control station simultaneously to all of the substations, the voltage line 160 may be electrically connected to each of the station selecting switch assemblies 72 through the all-station switch 88 which is also connected by conductor 226 to the audio control relay coil 190 in bypass relation to the talk push button switch 84. Thus, the all-station switch 88 cooperates with the switch assemblies 72 in order to establish intercommunication with all of the substations.

The station selecting switch assemblies 72 are displaceable from neutral positions (N) to two other operative positions in order to perform various functions in connection with a selected substation including the holding of normal and emergency call signals, cancelling of a call signal, establishing surveillance of a selected substation at the master control station and to establish audio and video intercommunication. Each station selecting switch assembly includes switch sections 228, 230, 232 and 234. The switch section 228 in each switch assembly is connected to the recorder control switch assembly 86 through conductor 218 in order to connect a television camera 46 at a selected substation into circuit when the switch assembly 72 is displaced to either of its two operative positions from the neutral position. Thus, the switch section 228 is operative to establish video intercommunication in both a left-hand intercommunication position (C) and in a right-hand surveillance position (S) as viewed in FIG. 5A. In the left-hand intercommunication position of the switch assembly 72, the switch section 230 is operative to cancel any normal or emergency call signal by disconnecting the indicator lamp 74 from conductor 146. In the other two positions of the switch assembly, conductor 146 is electrically connected to the associated indicator lamp 74 completing the signalling circuit. Audio and video intercommunication is established by the switch section 232 only when the switch assembly is in the left-hand communication position (C) thereby electrically connecting the voltage line 160 to the conductor 140 through which current is conducted to the relay component 110 of the substation associated with the switch assembly 72. The voltage line 160 is also connected to the conductor 140 in the neutral position through switch section 234 upon closing of the all-station switch 88.

It will be apparent that the system of the present invention involves several interrelated circuits programmed for operation by the various control switches and relays in order to perform the various functions including normal and emergency call signalling, substation surveillance, audio and video intercommunication, audio and video recording and audio and video replay. Further, by means of the station selecting switch assemblies 72, the substations over which surveillance and with which intercommunication is established, may be selected. Through the all-station switch 88, simultaneous presentation to all of the substations may be effected from the master control station. Through the recorder switch assembly 86, functioning of the video tape recorder 50 may be controlled in order to record program material orginating at the master control station or at any of the substations. In recording material originating at the master control station, live presentation at a selected substation may be simultaneously effected. Instant replay of any recorded program material may also be effected at either the master control station or at any selected substation.

The following chart summarizes utilization of the various interrelated circuits in performing the various programs as hereinbefore described:

| | CHART I | | | | | | |
|---|---|---|---|---|---|---|---|
| | CIRCUIT IN USE | | | | | | |
| | | | Video | | | | |
| Program | Signalling | Audio | SS to CS | SS to CS | VTR | All Sta. | Relay Power |
| MATV reception | | | | | | | |
| Substation call | X | | | | | | X |
| Emergency call | X | | | | | | |
| Surveillance | | | X | | | | X |
| Intercomm. | | X | X | X | | | X |
| All sta. comm. | | X | | X | | X | X |
| Record replay | | X | X | X | X | X | X |

The signalling circuit for normal call purposes is established between the master control station and a selected substation when the associated station selecting switch assembly 72 is in a neutral or surveillance position thereby connecting the chime 220, the associated indicated lamp 74 and the call relay coil 144 at the selected substation across the voltage lines 158 and 160 upon closing of the call push button switch 98. Energization of the call relay coil 144 completes a relay holding circuit through relay switch 148 and energizes the call lamp 152 at the substation from the power supply 112 associated with its receiver 44. The emergency call signal on the other hand is established by closing of the emergency switch 222 at the master control station connecting the pulsating relay component 224 in series with the indicator lamp 74 and chime 220 across the voltage lines through the same switch section 230 of the switch assembly 72 in its neutral or surveillance position.

In the surveillance position of a station selecting switch assembly 72, the system may be programmed for surveillance of the selected substation by closing of the mode switch 78 thereby energizing the audio-video control relays 162 and 164 at the master control station. At the same time, the actuated relay switch 166 disconnects the components of the receiver 40 at the master control station and connects the video output component 122' thereof to the television camera 46 at the selected substation. Thus, video surveillance of the selected substation is established.

With a station selecting switch assembly 72 in a communication position, and the mode switch 78 closed, audio and video intercommunication is established as in the case of the surveillance program through the audio and video circuits described. In addition, the switch section 232 of the station selecting switch assembly 72 connects the voltage line 160 to the relay component 110 at the selected substation in order to establish a video circuit from the control station television camera 42 to the video output component 122 of the receiver 44 at the selected substation. Thus, two-way video intercommunication is established. Two-way audio communication between the master control station and the selected substation is also established under control of the talk push button switch 84 at the master control station causing energization of the relay coil 190 in order to reverse the connections of the intercom amplifier 176 and the transducer 102 and 106 at the control station and substation respectively.

All station communication may be established with the station selecting switch assemblies in the neutral positions by closing of the all-station switch 88 and the mode switch 78 thereby supplying d.c. voltage to the relay components 110 at all the substations so that the video circuit only from the master control station to all of the substations may be completed as well as the audio circuits.

The mode switch 78, the all-station switch 88 and the recorder control switch assembly 86 may be actuated in different combinations in order to control the recording and replay functions. By closing the mode switch 78 and the all-station switch 88 and displacing the switch assembly 86 leftward as viewed in FIG. 5A to the control position, the audio and video circuits are completed to establish intercommunication between the control station and all of the substations. The station selecting switch assemblies will then, of course, be in the neutral positions. The master station television camera 42 will then be connected by the switch section 216, conductor 128 and relay switch 126 to the output component 122 of the receiver 44 at each of the substations, for live presentation of program material originating at the master control station. At the same time, the TV camera 42 at the master control station is connected through switch section 216 and relay switch 204 to the video record terminal 200 of the recorder for simultaneously recording the program material originating from the master control station. The recorder 50 may, of course, be switched from its recording mode of operation to playback operation in which case any program material previously recorded may be replayed at the master control station since the playback terminal 202 of the recorder will then be connected through relay switches 206 and 166 only to the output component 122' of receiver 40 of the master control station. In order to replay recorded program material at all of the substations, the recorder switch assembly 86 is displaced to its right-hand substation position (S) while the all-station switch 88 remains closed. An energizing circuit will then be completed by the switch section 212 for the relay coil 208 so that the playback terminal 202 of the recorder will be connected through relay switch 204, conductor 128 and relay switch 126 at each of the substations to the video output components 122 associated with the substation receivers 44. The relay switches 126 will be in their actuated positions since the relay coils 124 will be energized in view of the closure of the all-station switch 88 operative through the switch sections 234 in the neutral positions to complete energizing circuits through the substation relay components 110. The relay coils at the master control station, however, will be de-energized since the mode switch 78 is then opened.

In order to replay recorded program material originating from a selected substation at a selected substation, the recorder switch assembly 86 is again displaced in a right hand direction to its substation position while the station selecting switch assembly 72 associated with the selected substation is displaced leftward to its communication position as illustrated in FIG. 5A. In the recording mode of operation of the recorder 50, the record terminal 200 will then be connected through relay switch 206, switch section 214, conductor 218 and switch section 228 to the TV camera 46 at the selected substation since the relay coil 208 will then be energized by completion of an energizing circuit through the switch section 212. When the recorder 50 is switched to playback operation, the recorded material may be replayed at the selected substation since the playback terminal 202 will then be connected through relay switch 204, conductor 128 and relay switch 126 at the selected substation to the associated video output component 122 of the substation receiver.

It will be apparent from the foregoing summary that the relay power circuits will be in use for all of the programs except for the emergency call program as indicated in the foregoing Chart I. It should also be apparent that program material recorded by the video tape recorder 50 through the monitor-receiver component 54, from external standard broadcast signals, may also be instantly replayed at the master control station, at any selected substation or simultaneously at all of the substations in the various replay operational modes hereinbefore described. The various programs and functions as hereinbefore described are controlled by actuation of different combinations of control switches as summarized in the following Chart II.

CHART II
CONTROL SWITCHES

| FUNCTION | | (88) 11 Station Open | (88) Close | (222) Emergency Open | (222) Close | (84) Talk Open | (84) Close | (78) Mode Open | (78) Close | (98) Call Open | (98) Close | (86) VTR C | (86) N | (86) S | (72) Station Selector S | (72) N | (72) C |
|---|---|---|---|---|---|---|---|---|---|---|---|---|---|---|---|---|---|
| MATV Reception | | X | | X | | X | | X | | X | | | X | | | X | |
| Substation call | | X | | X | | X | | X | | | X | | X | | | X | |
| Emergency call | | X | | | X | X | | X | | X | | | X | | | X | |
| Surveillance | | X | | X | | X | | | X | X | | | X | | X | | |
| INTER- | Substation | X | | X | | | X | | | X | X | | X | | | | X |
| COM | Substation to Control | X | | X | | X | | | | X | X | | X | | | | X |
| All Sta. Comm. | | | X | X | | X | | | | X | X | | X | | | X | |
| RE- CORD or RE- PLAY | *At Control & Live to all | | X | X | | X | | | | X | X | X | | | | X | |
|  | At Selected Substation | X | | X | | X | | X | | X | X | | | X | | | X |
| **Replay to all Sta. | | | X | X | | X | | X | | X | X | | | X | | X | |

*86 must be relocated to (S) position to play back to substations
**78 may be in either position The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an antenna distribution system connected to a plurality of standard receivers having input and output components interconnected by interstage switch means, a control station located adjacent one of said standard receivers, a system interconnecting said control station with the other standard receivers at a plurality of remote stations comprising transducer means at each of said control and remote stations, mode control means at the control station connected to the interstage switch means for disconnecting the input and output components from each other in said one of the receivers and in selected ones of the other receivers, station selection means at the control station connected to the interstage switch means for rendering the interstate switch means associated with said selected ones of the other of the receivers effective to disconnect the components thereof from each other, communication circuit means operative in response to actuation of the station selection means for interconnecting the disconnected output components at selected remote stations with the transducer means at the control station to establish intercommunication between the control station and the selected remote stations, surveillance circuit means connected to the station selection means operative in response to actuation of the station selection means for connecting the disconnected output component of said one of the receivers at the control station to the transducer means at selected remote stations at which the input and output components are not disconnected, signalling means at each of the remote stations connected to the station selection means for transmitting an alerting signal to the control station identifying the remote station from which the signal originates, and message control means at the control station connected to the transducer means for controlling two-way transmission of intelligence signals between said control station and the selected remote stations when said intercommunication is established.

2. The combination of claim 1 including recording means located at the control station and operatively connected to the receivers for selectively recording internal signals picked up by the transducer means and external signals from the antenna distribution system, and replay means connected to the recording means and the station selection means for reproducing the recorded signals through the transducer means at any one of the stations.

3. The combination of claim 1 wherein the station selection means includes a source of electrical energy at the control station, relay means at each of the remote stations energized from said source of electrical energy for disconnecting the components of the other receivers from each other, and a plurality of switch assemblies at the control station respectively connected to the relay means at the remote stations, each of said switch assemblies being displaceable between at least two operative positions respectively rendering the surveillance circuit means and the message control means operative.

4. The combination of claim 3 wherein each of the switch assemblies includes a power controlling switch through which current is conducted to the relay means in one of said two operative positions, and a signal controlling switch cancelling the alerting signal in the other one of said two operative positions.

5. The combination of claim 1 wherein said signalling means comprises a source of electrical energy at the control station, a plurality of alerting devices at the control station, and a call switch means at each of the remote stations for connecting the source of electrical energy to one of the alerting devices corresponding to the remote station from which an alerting signal originates.

6. The combination of claim 5 including emergency signalling means connected to said source for intermittently interrupting supply of voltage to the alerting device.

7. In combination with an antenna distribution system connected to a plurality of standard receivers having input and output components interconnected by interstage switch means, a control station located adjacent one of said standard receivers, a system interconnecting said control station with the other receivers at a plurality of remote stations, comprising mode control means at the control station connected to the interstage switch means for disconnecting the input and output components from each other in said one of the receivers and in selected ones of the other receivers at selected remote stations, station selection means at the control station connected to the interstage switch means for rendering the interstage switch means associated with said selected ones of the other of the receivers effective to disconnect the components thereof from each other, visual means located at each of the stations and connected to the station selection means for surveillance of selected remote stations from the control station without interruption of antenna signal reception by the receivers, and message control means connected to the visual means and the station selection means for reconnecting the components of the receivers disconnected by the interstage switch means with the visual means to establish intercommunication between said stations.

8. The combination of claim 7 including station identifying signalling means at the control station connected to the station selection means, and signal generating means at each of the remote stations for transmitting calling signals through the station selection means to the station identifying signalling means.

9. The combination of clam 7 including recording means connected to the mode control and station selection means at the control station for recording audio and video signals originating at the control station and the remote stations, and replay means connected to the recording means for reproducing said recorded signals through the disconnected components of the receivers.

10. The combination of claim 9 including station identifying signalling means at the control station connected to the station selection means, and signal generating means at each of the remote stations for transmitting calling signals through the station selection means to the station identifying signalling means.

* * * * *